United States Patent
Otani et al.

(10) Patent No.: US 11,821,170 B2
(45) Date of Patent: Nov. 21, 2023

(54) REMOTE OPERATION SYSTEM FOR WORKING MACHINE

(71) Applicant: KOBELCO CONSTRUCTION MACHINERY CO., LTD., Hiroshima (JP)

(72) Inventors: Masaki Otani, Hiroshima (JP); Yoichiro Yamazaki, Hiroshima (JP); Seiji Saiki, Hiroshima (JP); Hitoshi Sasaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 686 days.

(21) Appl. No.: 16/980,551

(22) PCT Filed: Feb. 6, 2019

(86) PCT No.: PCT/JP2019/004151
§ 371 (c)(1),
(2) Date: Sep. 14, 2020

(87) PCT Pub. No.: WO2019/187660
PCT Pub. Date: Oct. 3, 2019

(65) Prior Publication Data
US 2021/0002860 A1    Jan. 7, 2021

(30) Foreign Application Priority Data
Mar. 29, 2018  (JP) .................. 2018-064897

(51) Int. Cl.
*G02B 27/01*  (2006.01)
*E02F 9/20*   (2006.01)
(Continued)

(52) U.S. Cl.
CPC .............. *E02F 9/205* (2013.01); *E02F 9/261* (2013.01); *G02B 27/017* (2013.01);
(Continued)

(58) Field of Classification Search
CPC ........ E02F 9/205; E02F 9/261; G02B 27/017; G02B 27/0179; G02B 27/0181;
(Continued)

(56) References Cited

U.S. PATENT DOCUMENTS

| 5,621,424 A  * | 4/1997 | Shimada | G02B 27/017 348/E13.059 |
|---|---|---|---|
| 2014/0361976 A1* | 12/2014 | Osman | G02B 27/017 345/156 |
| 2017/0322624 A1* | 11/2017 | Niccolini | E02F 9/0858 |

FOREIGN PATENT DOCUMENTS

| CN | 107709673 A | 2/2018 |
|---|---|---|
| EP | 2 624 552 A1 | 8/2013 |

(Continued)

OTHER PUBLICATIONS

International Search Report dated Apr. 16, 2019 in PCT/JP2019/004151 filed on Feb. 6, 2019, 2 pages.

(Continued)

*Primary Examiner* — Spencer D Patton
(74) *Attorney, Agent, or Firm* — Oblon, McClelland, Maier & Neustadt, L.L.P.

(57) ABSTRACT

A remote operation system for a working machine includes a control device enabling an operator wearing a wearable display to grasp the surrounding situation of himself/herself. The control device includes an operation intention judgment section judging the presence/absence of an operator's operation intention to a remote operation lever based on the contents of acquired judgment information, and a display image switching section. With judgment of presence of the (Continued)

operation intention, the display image switching section makes a working area image taken by a working area image taking camera be displayed in a particular display area of the wearable display. With judgment of absence of the operation intention, the display image switching section stops the display of the working area image in the at least a part of the particular display area and switches it to a surrounding visual-recognition allowing area allowing the operator to visually recognize the surroundings.

7 Claims, 4 Drawing Sheets

(51) Int. Cl.
  *E02F 9/26* (2006.01)
  *G05B 13/02* (2006.01)
  *G06F 3/14* (2006.01)
  *H04N 7/18* (2006.01)
(52) U.S. Cl.
  CPC ........... *G05B 13/0265* (2013.01); *G06F 3/14* (2013.01); *H04N 7/183* (2013.01)
(58) Field of Classification Search
  CPC ........ G02B 27/0187; G02B 2027/0138; G02B 2027/0187; G05B 13/0265; G06F 3/14; H04N 7/183
  See application file for complete search history.

(56) References Cited

FOREIGN PATENT DOCUMENTS

| | | | |
|---|---|---|---|
| JP | 6-62438 | A | 3/1994 |
| JP | 6-78247 | A | 3/1994 |
| JP | 8-234275 | A | 9/1996 |
| JP | 8-322064 | A | 12/1996 |
| JP | 10-126711 | A | 5/1998 |
| JP | 2008-111269 | A | 5/2008 |
| JP | 2012-21362 | A | 2/2012 |
| JP | 2015-226094 | A | 12/2015 |
| JP | 2016-189120 | A | 11/2016 |
| JP | 2018-121195 | A | 8/2018 |

OTHER PUBLICATIONS

Extended European Search Report dated Oct. 2, 2020 European Patent Application No. 19776060.6, 9 pages.
Le Quang, H, et al., "Remote control of excavator using head tracking and flexible monitoring method", Automation in Construction, Elsevier, Amsterdam, NL, vol. 81, Jun. 15, 2017, XP085112387, pp. 99-111.

* cited by examiner

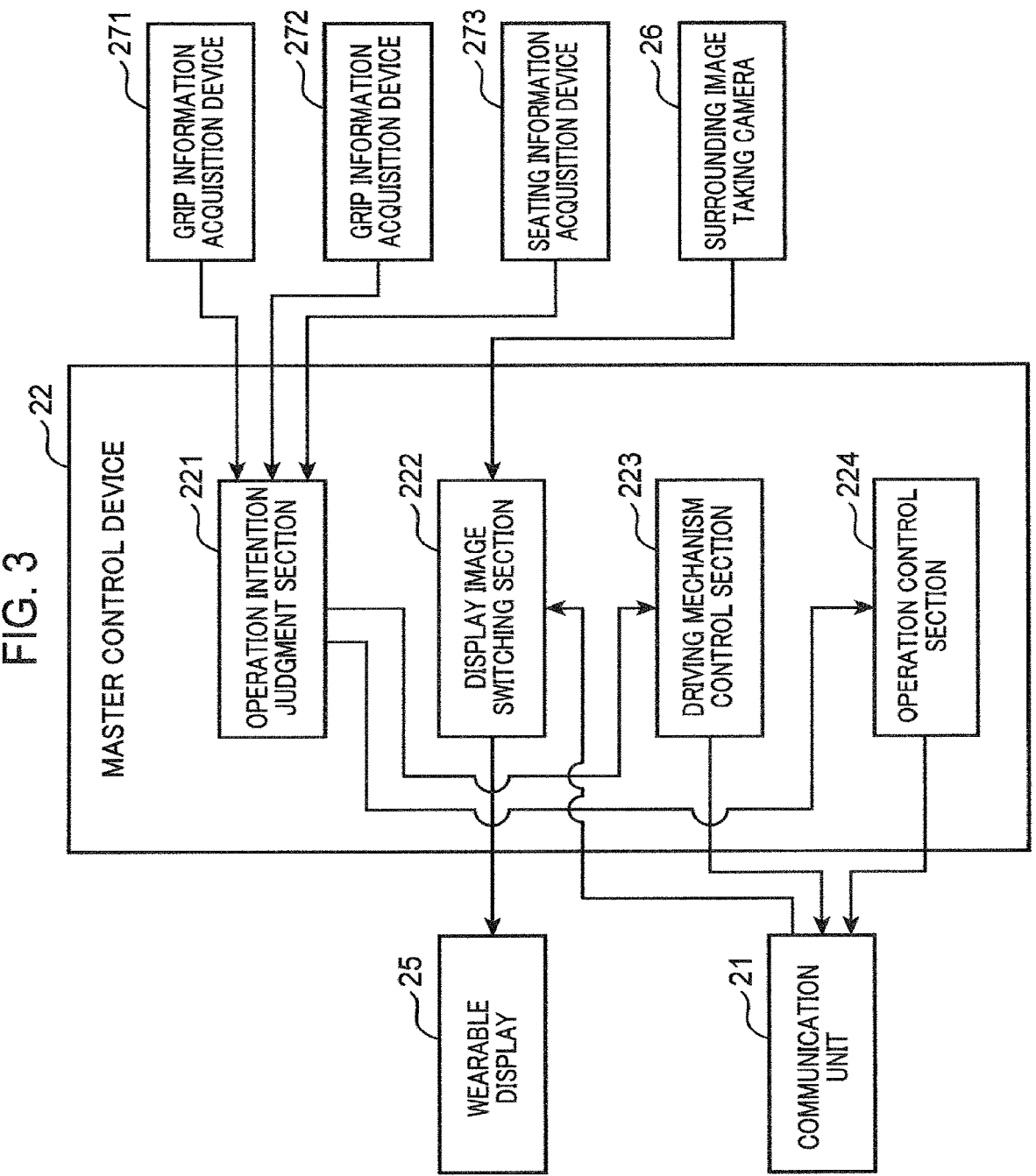

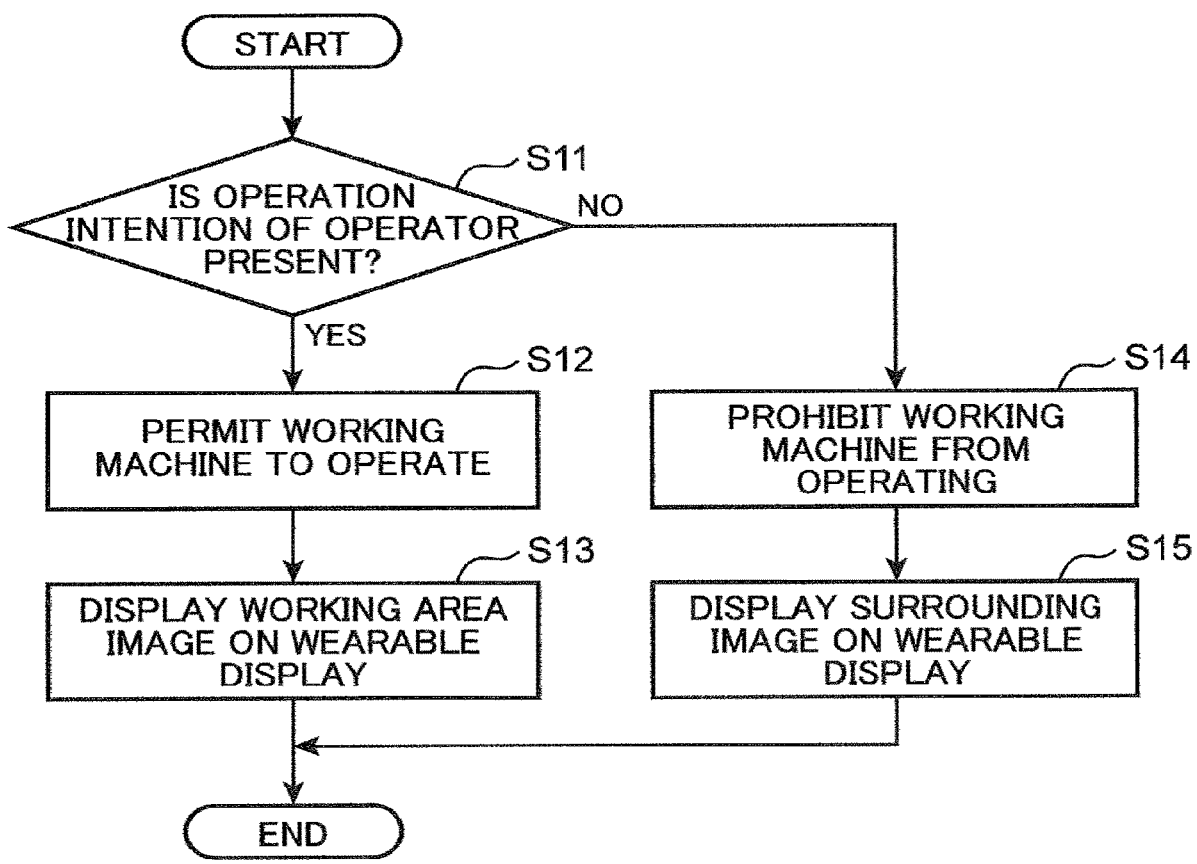

REMOTE OPERATION SYSTEM FOR WORKING MACHINE

TECHNICAL FIELD

The present invention relates to a remote operation system for a working machine.

BACKGROUND ART

Conventionally, working machines such as hydraulic excavators are known. A general working machine includes an operation seat on which an operator is seated and an operation lever which can be operated by the operator seated on the operation seat. Such a working machine is operated by the operation applied to the operation lever by the operator seated on the operation seat.

In recent years, besides the working machine operated by the operator seated on the operation seat as described above, a working machine has also been proposed that is operated by remote operation by an operator staying at a position distant from the working machine.

Patent Literature 1 below discloses a remote operation supporting image system that is used for a remote operation of a working machine. The remote operation supporting image system includes an imaging device provided on the working machine to image a construction target, and goggles worn on an operator in a remote operation room provided at a position distant from the working machine. The goggles have a pair of right and left liquid crystal panels, on which the image of the construction target taken by the imaging device is displayed. The operator can perform a remote operation of the working machine by operating a remote operation unit in the remote operation room while viewing the image.

The technique described in Patent Literature 1, however, involves a disadvantage of obstruction of the operator's visual field by the worn goggles. Specifically, the operator wearing the goggles can substantially see only the images displayed on the pair of right and left liquid crystal panels, hindered from grasping the surrounding situation of the operator himself or herself. This may cause inconvenience such as erroneous operation of the remote operation unit.

CITATION LIST

Patent Literature

Patent Literature 1: JP H08-234275

SUMMARY OF INVENTION

It is an object of the present invention to provide a remote operation system for a working machine, the remote operation system including a wearable display capable of being worn on an operator of the working machine and displaying an image of surroundings of the working machine to the operator wearing the wearable display, and a remote operation lever allowing an operation to be applied to the remote operation lever by the operator wearing the wearable display, the remote operation system enabling the operator wearing the wearable display to grasp the surrounding situation of the working machine.

Provided is a system for remote operation of a working machine, the system including: a remote operation lever that is disposed at a position distant from the working machine and allows an operation to be applied to the remote operation lever by an operator of the working machine while being held by the operator; at least one judgment information acquisition device capable of acquiring judgment information for judging presence or absence of an operation intention that is an intention of the operator to apply an operation to the remote operation lever; a working area image taking camera that is disposed on the working machine and capable of taking a working area image that is an image of surroundings of the working machine; a wearable display capable of displaying an image to the operator while being worn on the operator, the wearable display having a particular display area in which the working area image can be displayed; and a control device that causes the wearable display to display the working area image in the particular display area according to a content of the judgment information acquired by the at least one judgment information acquisition device. The control device includes an operation intention judgment section that judges presence or absence of the operation intention based on the content of the judgment information acquired by the at least one judgment information acquisition device, and a display image switching section that causes the wearable display to display the working area image in the particular display area, when the operation intention judgment section judges that the operation intention of the operator is present, and causes the wearable display to stop the display of the working area image in at least a part of the particular display area and switches the at least a part of the particular display area to a surrounding visual-recognition allowing area in which the wearable display allows the operator to visually recognize surroundings of the operator, when the operation intention judgment section judges that the operation intention of the operator is absent.

BRIEF DESCRIPTION OF DRAWINGS

FIG. 3 is a block diagram showing a functional configuration of a control device included in a master of the remote operation system shown in FIG. 1.

FIG. 4 is a flowchart showing image switching control implemented by the control device.

DESCRIPTION OF EMBODIMENTS

Hereinafter, embodiments of the present invention will be described in detail with reference to the accompanying drawings.

There will be described a remote operation system for a working machine (hereinafter, simply referred to as a remote operation system) according to an embodiment of the present invention, with reference to FIG. 1, which is a block diagram showing an overall configuration of a remote operation system.

Figure 2:
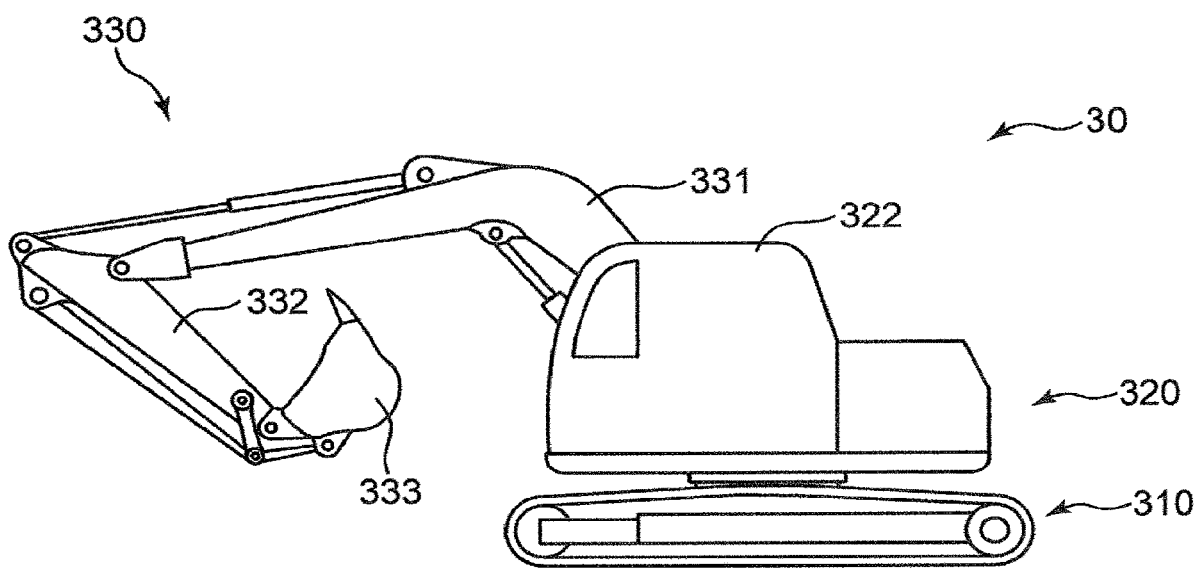
FIG. 2 is a side view showing an external appearance of the working machine shown in FIG. 1.

FIG. 2 is a side view showing an external appearance of a working machine 30 to which the remote operation system according to an embodiment of the present invention is applied.

The working machine 30 is a hydraulic excavator. The working machine 30 includes, for example, a crawler type lower travelling body 310, an upper slewing body 320 provided on the lower travelling body 310 so as to be slewable, and a working device 330 attached to the upper slewing body 320. The working device 330 includes, for example, a boom 331 attached to the upper slewing body 320 so as to be raisable and lowerable, an arm 332 attached to a distal end of the boom 331 so as to be rotationally movable, and an attachment 333 attached to a distal end of the arm 332 so as to be rotationally movable. The upper slewing body 320 includes an operating cab 322, in which a plurality of actual machine operation levers 31 as shown in FIG. 1 are disposed. In addition to the plurality of actual machine operation levers 31, the working machine 30 is equipped with a working area image taking camera 32, a gate lever 33, and a driving mechanism 34 for driving the gate lever, as shown in FIG. 1. These will be described in detail later.

The working machine remotely operated by the remote operation system according to the present embodiment is not limited to the hydraulic excavator as described above.

Figure 1:
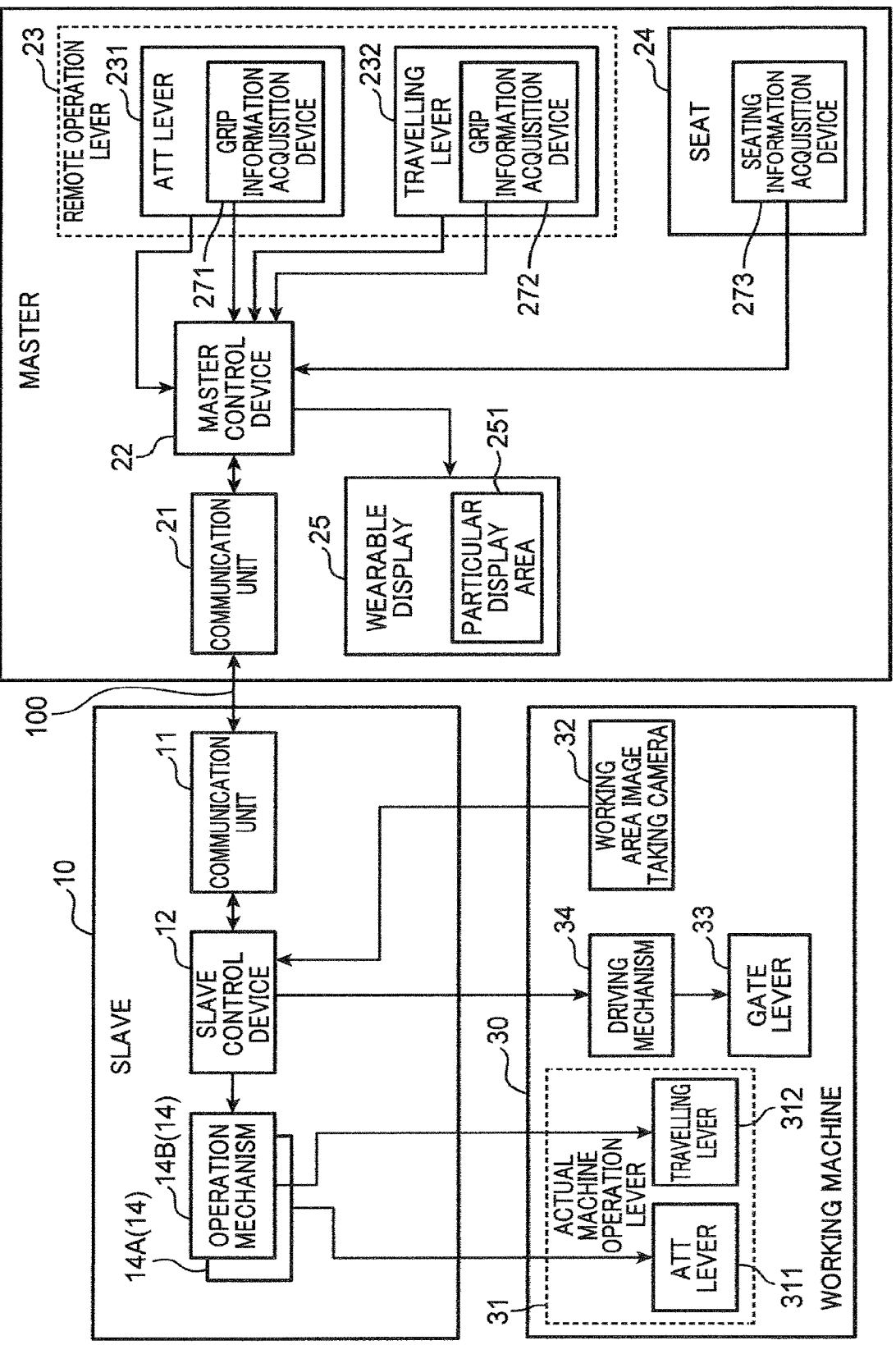
FIG. 1 is a block diagram showing an overall configuration of a remote operation system for a working machine according to an embodiment of the present invention.

FIG. 1 shows an overall configuration of the remote operation system. The remote operation system includes a slave 10 and a master 20, which will be described below.

The slave 10 is a slave operation device disposed on an operation seat of the working machine 30 to directly operate the plurality of actual machine operation levers 31 of the working machine 30 based on contents of an operation (operation amount and operation direction) applied to the master 20. The slave 10 is a machine that operates the working machine 30 as, so to speak, a dummy of an operator.

The master 20 is a master operation device disposed at a position distant from the working machine 30 to allow an operation to be directly applied to the master 20 by an operator for moving the working machine 30. The master 20 has a configuration simulating the operation seat of the working machine 30.

The slave 10 and the master 20 are interconnected through a communication path 100 so as to be communicable with each other. As the communication path 100 is employed, for example, a communication path for bringing the slave 10 and the master 20 into wireless communication with each other at a distance of several tens of meters to several hundreds of meters, such as specific power-saving wireless communication and Bluetooth (registered trademark). This however, an example; there may be employed, as the communication path 100, a public communication line including a mobile phone communication network, the Internet communication network, and the like. This allows the master 20 and the slave 10 to perform long-distance communication.

The master 20 includes a communication unit 21, a master control device 22, a plurality of remote operation levers 23 that directly receives an operation by an operator, a seat 24 as an operating seat on which the operator is seated, a wearable display 25 to be worn on the operator, a surrounding image taking camera 26 that takes an image of surroundings of the operator, and a plurality of judgment information acquisition devices that acquire judgment information for judging presence or absence of an operation intention that an intention of the operator to apply an operation to each of the plurality of remote operation levers 23. These components will be described below.

The communication unit 21 is formed of a communication device compatible with the communication method employed for the communication path 100. The communication unit 21 transmits, to the slave 10, operation information about respective operations applied to the plurality of remote operation levers 23 of the master 20, that is, information about respective operation amounts and operation directions. The communication unit 21 receives an image transmitted from the slave 10 (an image taken by the working area camera 32 described in detail later).

The master control device 22 is formed of a computer including a processor such as a CPU or an ASIC and a storage device such as a ROM and a RAM. The master control device 22 makes the communication unit 21 transmit various kinds of information (for example, the operation information and a gate lever command for instructing a position of the gate lever 33, which will be described in detail later). The master control device 22 switches the image to be displayed on the wearable display 25. Details of the master control device 22 will be described later.

Each of the plurality of remote operation levers 23 is disposed at a position distant from the working machine 30 and allows an operation to be applied thereto by the operator of the working machine 30 while being gripped by the operator. The plurality of remote operation levers 23 have similar configurations to the plurality of actual machine operation levers 31 of the working machine 30, respectively. The remote operation levers 23 include an ATT (attachment) lever 231 and a travelling lever 232.

The ATT lever 231 is formed of an operation lever tiltable in four directions of front, rear, left, and right and allows an operation to be applied to the ATT lever 231 by the operator for moving the working device (for example, the attachment 333 and the boom 331) of the working machine 30. Specifically, the ATT lever 231 allows a boom lowering operation, a boom raising operation, an attachment retracting operation, and an attachment pushing operation to be applied thereto. The boom lowering operation is an operation of tilting the ATT lever 231 forward to lower the boom 331. The boom raising operation is an operation of tilting the ATT lever 231 backward to raise the boom 331. The attachment retracting operation is an operation of tilting the ATT lever 231 to the left to rotationally move the attachment 333 in a direction toward the operating cab 332. The attachment pushing operation is an operation of tilting the ATT lever 231 to the right to rotationally move the attachment 333 in a direction away from the operation seat.

The travelling lever 232 is formed of an operation lever tiltable forward and backward and allows a forward operation and a reverse operation to be applied to the travelling lever 232 by an operator for moving the working machine 30 forward and backward. The forward operation is an operation of tilting the travelling lever 232 forward to move the working machine 30 forward, and the reverse operation is an operation of tilting the travelling lever 232 backward to move the working machine 30 backward.

Although the plurality of remote operation levers 23 shown in FIG. 1 includes the ATT lever 231 and the travelling lever 232, the remote operation lever according to the present invention is not limited thereto. For example, in the case where the working machine 30 includes a four-direction actual machine operation lever allowing a front-rear direction operation for moving the working device 330 and a right-left direction operation for moving the upper slewing body 320 to be applied thereto, the master 20 may include a remote operation lever having the same configuration as the actual machine operation lever. Thus, it is preferable that the remote operation lever according to the present invention corresponds to each of various actual machine operation levers installed on the working machine.

The seat 24 is disposed near the plurality of remote operation levers 23 so as to allow an operator seated on the seat 24 to grip each of the plurality of remote operation levers 23.

The wearable display 25 is a display capable of displaying an image for the operator wearing the wearable display 25. The wearable display 25 is, for example, a head mount display to be used while mounted on the head of the operator.

When being mounted on the operator's head and displaying no image, the wearable display 25 obstructs the operator's view. In this state, it is extremely difficult for the operator to directly visually recognize his or her own surroundings.

The wearable display 25 has a particular display area 251 in which a working area image taken by the working area image taking camera 32 can be displayed. The particular display area 251 may be set, for example, over the entire visible area visible to the operator wearing the wearable display 25, or may be set in a part of the visible area. The particular display area 251 is set, for example, for each of the eyes of the operator wearing the wearable display 25.

The surrounding image taking camera 26 is disposed at a position distant from the working machine 30 and takes a surrounding image that is an image of the surroundings of the operator. The surrounding image taking camera 26 is disposed on the wearable display 25 so as to move integrally with the wearable display 25 and takes an image forward of the operator wearing the wearable display 25. The image taking range of the surrounding image taking camera 26, therefore, changes depending on the orientation of the face of the operator.

Each of the plurality of judgment information acquisition devices acquires judgment information for judging the presence or absence of the operation intention, that is, the intention of the operator to apply an operation to the remote operation lever 23. The plurality of judgment information acquisition devices includes grip information acquisition devices 271, 272 and a seating information acquisition device 273.

The grip information acquisition device 271 acquires, as the judgment information, grip information about presence or absence of a gripping motion of gripping the ATT lever 231 by the operator. The grip information acquisition device 271 is disposed, for example, in a portion of the ATT lever 231 to be gripped by the operator. The grip information acquisition device 271 includes, for example, a grip sensor. The grip sensor only has to detect the gripping motion of gripping the ATT lever 231 by the operator. The grip sensor may include, for example, a sensor electrode disposed on the ATT lever 231, a measurement unit that measures a value of electrostatic capacitance between the sensor electrode and a human body (operator), and an acquisition unit that acquires, based on the capacitance value measured by the measurement unit, grip information that is information about the presence or absence of the gripping motion. The grip sensor, alternatively, may include a measurement unit that measures a grip force (pressure) exerted on the ATT lever 231 by the operator, and an acquisition unit that acquires grip information about the presence or absence of the gripping motion based on the grip force (pressure) measured by the measurement unit.

The grip information acquisition device 272 acquires, as the judgment information, grip information that is information about the presence or absence of a gripping motion of gripping the travelling lever 232 by the operator. The grip information acquisition device 272 is disposed, for example, in a portion of the travelling lever 232 to be gripped by the operator. The grip information acquisition device 272 includes, for example, a grip sensor. The grip sensor only has to detect the gripping motion of gripping the travelling lever 232 by the operator. As the grip sensor is employed, for example, a sensor similar to that used for the ATT lever 231.

The seating information acquisition device 273 acquires, as judgment information, seating information that is information about the presence or absence of seating of the operator on the seat 24. The seating information acquisition device 273 is disposed, for example, in a portion of the seat 24 where the operator is seated. The seating information acquisition device 273 is achieved with, for example, a seating sensor. The seating sensor only has to detect the seating of the operator on the seat 24. As the seating sensor is employed, for example, an ultrasonic sensor, an infrared sensor, a proximity sensor, a weight sensor (for example, a strain gauge) or the like.

The slave 10 includes a communication unit 11, a slave control device 12, and a plurality of operation mechanisms 14 that operate the plurality of actual machine operation levers 31 of the working machine 30, respectively. These components will be described below.

The communication unit 11 is formed of a communication device compatible with a communication system employed for the communication path 100. The communication unit 11 receives a signal transmitted from the master 20, for example, the operation information and the gate lever command. The communication unit 11 transmits to the master 20 the image being taken by the working area image taking camera 32.

The slave control device 12 is formed of a computer including a processor such as a CPU or an ASIC and a storage device such as a ROM and a RAM. The slave control device 12 makes the communication unit 11 transmit an image taken by the working area image taking camera 32. The slave control device 12 controls the action of the operation mechanism 14 based on a signal sent from the master 20.

The plurality of operation mechanisms 14 are formed of actuators, each generating an operation force according to operation contents (operation amount and operation direction) sent from the master 20 and each applying the operation force to the corresponding one of the plurality of actual machine operation levers 31. In the example shown in FIG. 1, where the plurality of actual machine operation levers 31 includes the ATT lever 311 and the travelling lever 312, the plurality of operation mechanisms 14 includes an operation mechanism 14A corresponding to the ATT lever 311 and an operation mechanism 14B corresponding to the travelling lever 312. For the ATT lever 311 operable in the "front-rear" direction and the "right-left" direction, the operation mechanism 14A includes an actuator for actuating the ATT lever 311 in the "front-rear" direction, and an actuator for actuating the ATT lever 31 in the "right-left" direction. For the travelling lever 12 operable in the "front-rear" direction, the operation mechanism 14B includes an actuator for actuating the travelling lever 312 in the "front-rear" direction.

When the communication unit 11 receives operation information about the ATT lever 231 (information about operation amount and operation content), the slave control device 12 generates a control signal according to the operation information and inputs the control signal to the operation mechanism 14A. When the communication unit 11 receives operation information about the travelling lever 232 (information about operation amount and operation content), the slave control device 12 generates a control signal according to the operation information and inputs the control signal to the operation mechanism 14B. This causes the slave 10 to directly apply an operation to the working machine 30 as a dummy of an operator who operates the master 20.

Next will be described about the actual machine operation lever 31, the working area image taking camera 32, the gate lever 33, and the driving mechanism 34 mounted on the working machine 30.

The plurality of actual machine operation levers 31 are provided in the operating cab 322 of the working machine 30 and tilted in the direction of the operation force applied thereto from the slave 10. Among the plurality of actual machine operation levers 31, the ATT lever 311 is formed of an operation lever tiltable in four directions of front, rear, left, and right, similarly to the ATT lever 231, and the travelling lever 312 is formed of an operation lever tiltable forward and backward similarly to the travelling lever 232. The operation applied to the ATT lever 311 to tilt it forward or backward causes the boom 331 to be lowered or raised. The operation applied to the ATT lever 31 to tilt it in the right-left direction causes the attachment 333 to be rotationally moved. The operation applied to the travelling lever 322 to tilt it forward causes the lower travelling body 310 to be moved forward, and the operation applied to the travelling lever 322 to tilt it backward causes the lower travelling body 310 to be moved backward.

The working area image taking camera 32 takes a working area image that is an image of a working area around the working machine 30. The working area image taking camera 32 is, for example, provided in the operating cab 322 to take an image of an area forward of the operating cab 322.

The gate lever 33 is disposed so as to open and close an entrance leading to an operation seat in the operating cab 322. At an opening position for opening the entrance, the gate lever 33 allows a third person (for example, a worker existing around the working machine 30) to get into the operation seat. At a closing position for closing the entrance, the gate lever 33 prevents a third person from getting into the operation seat.

The driving mechanism 34 drives the gate lever 33 in a direction to open or close the entrance, that is, moves the gate lever 33 between the opening position and the closing position. The driving mechanism 34 includes, for example, an actuator, generating a driving force in accordance with a gate lever command sent from the master 20 and applying the driving force to the gate lever 33.

Next will be further described about the master control device 22 with reference to FIG. 3, which is a functional block diagram showing the master control device 22.

The master control device 22 makes the working area image be displayed in the particular display area 251 of the wearable display 25 according to the contents of the judgment information acquired by the plurality of judgment information acquisition devices, namely, the grip information acquisition devices 271, 272 and the seating information acquisition device 273 in this embodiment.

The master control device 22 includes an operation intention judgment section 221, a display image switching section 222, a driving mechanism control section 223, and an operation control section 224. These components will be described below.

The operation intention judgment section 221 judges the presence or absence of an operation intention of the operator to any one of the plurality of remote operation levers 23 based on the contents of the judgment information acquired by the plurality of judgment information acquisition devices, namely, the grip information acquisition devices 271, 272 and the seating information acquisition device 273 in this embodiment. The operation intention judgment section 221 judges whether or not an operation intention of the operator with respect to any one of the plurality of remote operation levers 23 is present, in this embodiment whether or not operation intention judgment conditions set in advance are satisfied, based on the grip information acquirable by the grip information acquisition devices 271, 272 and the seating information acquirable by the seating information acquisition device 273. In this embodiment, the operation intention judgment conditions is the presence of a gripping motion by the operator on at least one of the ATT lever 231 and the travelling lever 232 that are the plurality of remote operation levers 23, and the presence of seating of the operator on the seat 24.

The display image switching section 222 switches the image to be displayed on the wearable display 25 according to the result of judgment made by the operation intention judgment section 221 on the presence or absence of the operation intention. Specifically, the display image switching section 222 causes the wearable display 25 to display the working area image in the particular display area 251, when the operation intention judgment section 221 judges that the operation intention is present; on the other hand, the display image switching section 222 causes the wearable display 25 to stop the display of the working area image in the particular display area 251 and makes the surrounding image be displayed in the particular display area 251, when the operation intention judgment section 221 judges that the operation intention is absent. In summary, the display image switching section 222 causes the wearable display 25 to display the surrounding image instead of the working area image in the particular display area. 251 when the operation intention is judged to be absent. Thus, in the present embodiment, the entire particular display area 251 functions as a surrounding visual-recognition allowing area.

The driving mechanism control section 223 generates a gate lever command to make the driving mechanism 34 operate to move the gate lever 33 to the closing position, when the operation intention judgment section 221 judges that the operation intention is present; on the other hand, the driving mechanism control section 223 generates a gate lever command to make the driving mechanism 34 operate to move the gate lever 33 to the opening position, when the operation intention judgment section 221 judges that the operation intention is absent. Furthermore, the driving mechanism control section 223 makes the communication unit 21 transmit the gate lever command. When the communication unit 11 of the slave 10 receives the gate lever command, the slave control device 12 of the slave 10 controls the motion of the driving mechanism 34 to move the gate lever 33 to the closing position or the opening position based on the received gate lever command.

The operation control section 224 permits the working machine 30 to operate based on an operation applied to any one of the plurality of remote operation levers 23, when the operation intention judgment section 221 judges that the operation intention is present; on the other hand, the operation control section 224 prohibits the working machine 30 from operating based on the operation, when the operation intention judgment section 221 judges that the operation intention is absent. Specifically, the operation control section 224 makes the communication unit 21 transmit an operation permission command or operation prohibition command, which is a command to or not to permit the operation of the working machine 30 based on the operation applied to any one of the plurality of remote operation levers 23. When the communication unit 11 of the slave 10 receives the operation permission command or the operation prohibition command, the slave control device 12 of the slave 10 controls the action of the operation mechanisms 14A, 14B according to the received operation permission or prohibition command. Specifically, when the operation permission command is received, the slave control device 12 makes the operation mechanisms 14A, 14B operate to apply to the actual machine operation lever 31 an operation corresponding to the operation applied to the remote operation lever 23 by the operator. Conversely, when the operation prohibition command is received, the slave control device 12 prohibits the action of the operation mechanisms 14A, 14B to apply an operation to the actual machine operation lever 31 regardless of the operation applied to the remote operation lever 23 by the operator.

Next will be described an image switching process executed by the master control device 22 with reference to FIG. 4, which is a flowchart showing the image switching process.

First, in step S11, the operation intention judgment section 221 of the master control device 22 judges the presence or absence of an operation intention of the operator to any one of the plurality of remote operation levers 23.

When the operation intention judgment section 221 judges that the operation intention is present (YES in step S11), the master control device 22 brings the working machine 30 into an operation allowable state, in step S12. Specifically, the operation control section 224 of the master control device 22 makes the communication unit 21 transmit an operation permission command to permit the working machine 30 to operate based on the operation applied to the plurality of remote operation levers 23, and at the same time the driving mechanism control section 223 makes the communication unit 21 transmit a gate lever command to move the gate lever 33 to the closing position.

Subsequently, step S13 the display image switching section 222 of the master control device 22 causes the wearable display 25 to display the working area image in the particular display area 251 thereof, that is, the image that the working area image taking camera 32 is taking.

When the operation intention judgment section 221 judges that the operation intention is absent (NO in step S11), the master control device 22 brings the working machine 30 into an operation prohibition state, in step S14. Specifically, the operation control section 224 of the master control device 22 makes the communication unit 21 transmit an operation prohibition command to prohibit the working machine 30 from operating based on the operation applied to the plurality of remote operation levers 23, and at the same time the driving mechanism control section 223 makes the communication unit 21 transmit a gate lever command to move the gate lever 33 to the opening position.

Subsequently, in step S15, the display image switching section 222 of the master control device 22 causes the wearable display 25 to display the surrounding image in the particular display area 251 thereof, that is, the image that the surrounding image taking camera 26 is taking.

In such a remote operation system, when an operator is judged to have an operation intention, that is, an intention to apply an operation to any one of the plurality of remote operation levers 23, the working area image taken by the working area image taking camera 32 is displayed in the particular display area 251 of the wearable display 25. This display allows the operator to visually recognize the surroundings of the working machine 30 through the wearable display 25. Thus, when having the operation intention, the operator can be provided with such an environment that the operator can recognize mainly the surrounding situation of the working machine 30. This enables the operator to perform accurate remote operation of the working machine 30.

On the other hand, when the operator does not have the operation intention, the display of the working area image is stopped in the particular display area 251, and the surrounding image (the image taken by the surrounding image taking camera 26) is displayed in the particular display area 251. This display enables the operator to grasp the surrounding situation of the operator himself or herself while wearing the wearable display 25. Thus, when not having the operation intention, the operator can be provided with such an environment that the operator can mainly recognize the surrounding situation of himself or herself. This prevents the operator from erroneously applying an operation to the remote operation levers 23 in spite of no operation intention of the operator to the plurality of remote operation levers 23.

In the above-mentioned remote operation system, the consideration with not only the gripping motion of gripping the remote operation lever 23 needed for remote operation of the working machine 30 but also the operating posture of the operator (specifically, seating on the seat 24) enables more accurate judgment to be made on the presence or absence of an operation intention of the operator to the remote operation levers 23.

In the remote operation system described above, the display of the surrounding image in the particular display area 251 of the wearable display 25 enables the operator to grasp the surrounding situation of himself or herself while wearing the wearable display 25, regardless of the transmitting property of the wearable display 25.

The surrounding image taking camera 26 of the remote operation system described above, being disposed on the wearable display 25 so as to move integrally with the wearable display 25 mounted on the head of the operator to take an image forward of the operator, can always take the image forward of the operator with changing the orientation of the surrounding image taking camera 26 itself according to the orientation of the face of the operator. This enables the operator to accurately grasp the surrounding situation of himself or herself, regardless of the orientation of the face of the operator.

In the above remote operation system, the gate lever 33, which opens and closes the entrance leading to the operation seat of the working machine 30 according to the operation intention of the operator to the remote operation levers 23, can prevent a third person (for example, an operator who is present around the working machine 30, or the like) from getting into the operation seat of the working machine 30 while remote operation of the working machine 30 by the operator is performed.

Furthermore, the remote operation system can secure higher safety by switching the permission/prohibition of the operation of the working machine 30 according to the operation intention of the operator on the plurality of operation levers 23. For example, even if the operator erroneously applies an operation to any of the plurality of operation levers 23 in spite of the absence of his or her operation intention to any of the plurality of operation levers 23, the working machine 30 can be prevented from operating based on the erroneous operation. In short, the working machine 30 can be prevented from operating contrary to the intention of the operator.

The embodiments of the present invention having been described in detail above are merely exemplifications; the present invention is not limited in any degree to the above-described embodiments.

While the remote operation system shown in FIG. 1 includes the slave 10 that is disposed at the operation seat of the working machine 30 to apply an actual machine operation to corresponding one of the plurality of actual machine operation levers 31 in the working machine 30, the corresponding one corresponding to the operation applied by the operator to any of the plurality of remote operation levers 23 in the master 20, the remote operation system according to the present invention is not limited to the mode shown in FIG. 1. The present invention encompasses, for example, also a mode without the slave 10 and a mode in which the working machine 30 does not include the actual machine operation levers 31. Besides, the remote operation lever according to the present invention may be single.

The judgment information acquisition device according to the present invention is not limited to one that is disposed in a portion with which a part of the body of the operator performing the remote operation of the working machine is always in contact, such as the grip information acquisition devices 271, 272 and the seating information acquisition device 273 described in the above embodiment. For example, the judgment information acquisition device may be achieved by a switch allowing an operator to apply thereto a pressing operation. Such a switch is preferably disposed, for example, around the remote operation lever.

The remote operation system according to the present invention may include either only a single judgment information acquisition device or a plurality of judgment information acquisition devices. A remote operation system eluding a plurality of judgment information acquisition devices may be configured to judge the presence of an operation intention of an operator only when all of respective pieces of judgment information acquired by the plurality of judgment information acquisition devices indicate the presence of the operation intention of the operator. For example, the operation intention judgment section 221 according to the above-described embodiment may be configured to judge that the operation intention is present only when each of pieces of grip information acquired by the two grip information acquisition devices 271, 272, respectively, indicates a gripping motion and the seating information acquired by the seating information acquisition device 273 indicates seating of the operator on the seat 24. The operation intention judgment section according to the present invention, alternatively, may judge that the operation intention of the operator is present when at least one of respective pieces of judgment information acquired by the plurality of judgment information acquisition devices indicates the presence of the operation intention of the operator. For example, in a mode with omission of the seating information acquisition device 273 in the above-described embodiment, the operation intention judgment section 221 may be configured to judge that the operation intention of the operator is present when at least one of grip information acquired by the remaining two grip information acquisition devices 271, 272 indicates the presence of the operation intention of the operator. Examples of the single judgment information acquisition device include a switch allowing an operator to apply thereto a pressing operation as described above.

The display image switching section according to the present invention is not limited to one that causes the wearable display to display the surrounding image over the entire particular display area as in the above-described embodiment. For example, it may be configured to make the surrounding image be displayed only in a part of the particular display area. In short, the surrounding visual-recognition allowing area according to the present invention may be a part of the particular display area. Besides, the present invention is not limited to the mode in which the surrounding image is displayed in the surrounding visual-recognition allowing area. For example, the surrounding visual-recognition allowing area according to the present invention may be an area having a transmitting property enough to allow the surroundings of the operator to be visually recognized through the surrounding visual-recognition allowing area, namely, a transmission area. The transmission area allows the operator to visually recognize his or her surroundings through the transmission area. Besides, the case where the surrounding visual recognition image area is a part of the particular display area allows the operator to visually recognize the surrounding area of the operator while the operator watching the working area image.

The surrounding image taking camera according to the present invention is not limited to one provided on the wearable display. For example, the surrounding image taking camera according to the present invention may be provided above the operating seat on which the operator is seated.

The present invention does not absolutely require the surrounding image taking camera. For example, in the case of a wearable display provided with a transmission area capable of transmitting the surroundings of the operator on a periphery of the particular display area, the operator can visually recognize his or her own surroundings through the transmission area constantly, which renders the surrounding image taking camera not absolutely necessary.

As described above, there is provided a remote operation system for a working machine, the remote operation system including a wearable display capable of being worn on an operator of the working machine and displaying an image of surroundings of the working machine to the operator wearing the wearable display, and a remote operation lever allowing an operation to be applied to the remote operation lever by the operator wearing the wearable display, the remote operation system enabling the operator wearing the wearable display to grasp the surrounding situation of the working machine.

Provided is a system for remote operation of a working machine, the system including: a remote operation lever that is disposed at a position distant from the working machine and allows an operation to be applied to the remote operation lever by an operator of the working machine while being held by the operator; at least one judgment information acquisition device capable of acquiring judgment information for judging presence or absence of an operation intention that is an intention of the operator to apply an operation to the remote operation lever; a working area image taking camera that is disposed on the working machine and capable of taking a working area image that is an image of surroundings of the working machine; a wearable display capable of displaying an image to the operator while being worn on the operator, the wearable display having a particular display area in which the working area image can be displayed; and a control device that causes the wearable display to display the working area image in the particular display area according to a content of the judgment information acquired by the at least one judgment information acquisition device. The control device includes an operation intention judgment section that judges presence or absence of the operation intention based on the content of the judgment information acquired by the at least one judgment information acquisition device, and a display image switching section that causes the wearable display to display the working area image in the particular display area, when the operation intention judgment section judges that the operation intention of the operator is present, and causes the wearable display to stop the display of the working area image in at least a part of the particular display area and switches the at least a part of the particular display area to a surrounding visual-recognition allowing area in which the wearable display allows the operator to visually recognize surroundings of the operator, when the operation intention judgment section judges that the operation intention of the operator is absent.

In the remote operation system for a working machine, when the operation intention judgment section judges that the operator has the operation intention with respect to the remote operation lever, the display image switching section causes the wearable display to display the working area image in the particular display area thereof, thereby allowing the operator to visually recognize the surroundings of the working machine through the wearable display. Thus, the remote operation system can provide the operator having the operation intention to the remote operation lever with an environment where the operator can mainly recognize the surrounding situation of the working machine. This enables the operator to accurately perform remote operation of the working machine.

On the other hand, when the operation intention judgment section judges that the operator does not have the operation intention to the remote operation lever, the display image switching section causes the wearable display to stop the display of the working area image in at least a part of the particular display area and switches the at least a part of the particular area to a state of allowing the operator to visually recognize the surroundings of himself or herself. This allows the operator to grasp the surrounding situation of himself or herself while wearing the wearable display. Thus, the remote operation system can provide an environment in which the operator can mainly recognize the surrounding situation of the operator when the operator does not have the operation intention to the remote operation lever. This enables an operator having no operation intention to the remote operation lever to be prevented from applying an erroneous operation to the remote operation lever.

Preferably, the at least one judgment information acquisition device includes a grip information acquisition device capable of acquiring, as the judgment information, grip information that is information about presence or absence of a gripping motion of gripping the remote operation lever by the operator, and the operation intention judgment section is configured to judge that the operation intention is present when the grip information that indicates the presence of the gripping motion is acquired.

The thus configured operation intention judgment section can accurately judge the presence or absence of the operation intention based on presence or absence of the gripping motion to the remote operation lever needed for remote operation of the working machine.

Preferably, the at least one judgment information acquisition device further includes a seating information acquisition device capable of acquiring, as the judgment information, seating information that is information about presence or absence of seating of the operator on an operating seat provided at a position where the operator is able to be seated with gripping the remote operation lever, and the operation intention judgment section is configured to judge that the operation intention is present only when a judgment condition is satisfied that the grip information indicating the presence of the gripping motion is acquired and that the seating information indicating the presence of the seating is acquired.

The thus configured operation intention judgment section, which takes account for not only the presence or absence of the gripping motion but also the operating posture of the operator, specifically the presence or absence of seating of the operator, can make more accurate judgment on the presence or absence of the operation intention of the operator to the remote operation lever.

The remote operation system, preferably, further includes a surrounding image taking camera disposed at a position distant from the working machine and takes a surrounding image that is an image of surroundings of the operator, wherein the display image switching section is configured to make the surrounding image be displayed in the surrounding visual-recognition allowing area when the operation intention judgment section judges that the operation intention is absent.

The thus configured display image switching section enables the operator to grasp the surrounding situation of himself or herself with the wearable display being worn on the operator, regardless of the transmitting property of the wearable display.

Preferably, the wearable display is used in a state of being worn on a head of the operator, and the surrounding image taking camera is disposed on the wearable display so as to move integrally with the wearable display to take an image forward of the operator.

The thus disposed surrounding image taking camera can take an image forward of the operator regardless of the orientation of the face of the operator, thereby allowing the operator to accurately grasp the surroundings of himself or herself regardless of orientation of the face of the operator.

The remote operation system, preferably, further includes a gate lever movable between a closing position for closing an entrance leading to an operation seat provided in the working machine and an opening position for opening the entrance, and a driving mechanism that drives the gate lever to move the gate lever between the closing position and the opening position, wherein the control device further includes a driving mechanism control section that controls the driving mechanism to move the gate lever to the closing position when the operation intention judgment section judges that the operation intention is present and to move the gate lever to the opening position when the operation intention judgment section judges that the operation intention is absent.

The driving mechanism and the driving mechanism control section, switching the position of the gate lever so as to open and close the entrance according to the presence or absence of the operation intention, can prevent a third person (for example, an operator who exists around the working machine, or the like) from getting into the operation seat of the working machine while remote operation of the working machine is performed by the operator.

Preferably, the control device further includes an operation control section that permits the working machine to operate based on an operation applied to the remote operation lever when the operation intention judgment section judges that the operation intention is present and prohibits the working machine from operating based on the operation applied to the remote operation lever when the operation intention judgment section judges that the operation intention is absent.

The operation control section thus controlling the operation of the working machine based on the presence or absence of the operation intention of the operator to the remote operation lever can prevent the working machine from operating contrary to the intention of the operator due to an erroneous operation applied to the remote operation lever by an operator having no operation intention to the remote operation lever.

The invention claimed is:

1. A remote operation system for remotely operating a working machine, the remote operation system comprising:
- a remote operation lever that is disposed at a position distant from the working machine and allows an operation to be applied to the remote operation lever by an operator of the working machine while being held by the operator;
- at least one judgment information acquisition device capable of acquiring judgment information for judging presence or absence of an operation intention that is an intention of the operator to apply an operation to the remote operation lever;
- a working area image taking camera that is disposed on the working machine and capable of taking a working area image that is an image of surroundings of the working machine;
- a wearable display capable of displaying an image to the operator while being worn on the operator, the wearable display having a particular display area in which the working area image can be displayed; and
- a control device that causes the wearable display to display the working area image in the particular display area according to a content of the judgment information acquired by the at least one judgment information acquisition device,
- the control device including an operation intention judgment section that judges presence or absence of the operation intention based on the content of the judgment information acquired by the at least one judgment information acquisition device, and a display image switching section that causes the wearable display to display the working area image in the particular display area, when the operation intention judgment section judges that the operation intention of the operator is present, and causes the wearable display to stop the display of the working area image in at least a part of the particular display area and switches the at least a part of the particular display area to a surrounding visual-recognition allowing area in which the wearable display allows the operator to visually recognize surroundings of the operator, when the operation intention judgment section judges that the operation intention of the operator is absent.

2. The remote operation system for the working machine according to claim 1, wherein the at least one judgment information acquisition device includes a grip information acquisition device capable of acquiring, as the judgment information, grip information that is information about presence or absence of a gripping motion of gripping the remote operation lever by the operator, and the operation intention judgment section is configured to judge that the operation intention is present when the grip information that indicates the presence of the gripping motion is acquired.

3. The remote operation system for the working machine according to claim 2, wherein the at least one judgment information acquisition device further includes a seating information acquisition device capable of acquiring, as the judgment information, seating information that is information about presence or absence of seating of the operator on an operating seat provided at a position where the operator is able to be seated with gripping the operation lever, and the operation intention judgment section is configured to judge that the operation intention is present only when a judgment condition is satisfied, the judgment condition being that the grip information indicating the presence of the gripping motion is acquired and that the seating information indicating the presence of the seating is acquired.

4. The remote operation system for the working machine according to claim 1, further comprising a surrounding image taking camera that is disposed at a position distant from the working machine and takes a surrounding image that is an image of surroundings of the operator, wherein the display image switching section makes the surrounding image to be displayed in the surrounding visual-recognition allowing area when the operation intention judgment section judges that the operation intention is absent.

5. The remote operation system for the working machine according to claim 4, wherein the wearable display is used in a state of being worn on a head of the operator, and the surrounding image taking camera is disposed on the wearable display so as to move integrally with the wearable display to take an image forward of the operator.

6. The remote operation system for the working machine according to claim 1, further comprising a gate lever movable between a closing position for closing an entrance leading to an operation seat provided in the working machine and an opening position for opening the entrance, and a driving mechanism that drives the gate lever to move the gate lever between the closing position and the opening position, wherein the control device further includes a driving mechanism control section that controls the driving mechanism to move the gate lever to the closing position when the operation intention judgment section judges that the operation intention is present and to move the gate lever to the opening position when the operation intention judgment section judges that the operation intention is absent.

7. The working machine remote operation system according to claim 1, wherein the control device further includes an operation control section that permits the working machine to operate based on an operation applied to the remote operation lever when the operation intention judgment section judges that the operation intention is present and prohibits the working machine from operating based on the operation applied to the remote operation lever when the operation intention judgment section judges that the operation intention is absent.

* * * * *